US010776406B2

(12) United States Patent
Hamilton et al.

(10) Patent No.: US 10,776,406 B2
(45) Date of Patent: Sep. 15, 2020

(54) SYSTEM FOR MULTI-CRITERIA DECISION ANALYSIS

(71) Applicant: United States of America—U.S. Army, Alexandria, VA (US)

(72) Inventors: Michelle Hamilton, Alexandria, VA (US); John A Nedza, Alexandria, VA (US); Demetra E Voyadgis, Alexandria, VA (US)

(73) Assignee: UNITED STATES OF AMERICA AS REPRESENTED BY THE SECRETARY OF THE ARMY, Alexandria, VA (US)

( * ) Notice: Subject to any disclaimer, the term of this patent is extended or adjusted under 35 U.S.C. 154(b) by 283 days.

(21) Appl. No.: 15/721,491

(22) Filed: Sep. 29, 2017

(65) Prior Publication Data

US 2019/0102406 A1   Apr. 4, 2019

(51) Int. Cl.

| G06F 16/29 | (2019.01) |
| G06F 17/18 | (2006.01) |
| H04W 4/90 | (2018.01) |
| G06F 16/24 | (2019.01) |
| G06Q 50/26 | (2012.01) |
| G06Q 10/06 | (2012.01) |
| G06Q 10/00 | (2012.01) |
| G06Q 10/10 | (2012.01) |

(52) U.S. Cl.
CPC .............. *G06F 16/29* (2019.01); *G06F 16/24* (2019.01); *G06F 17/18* (2013.01); *G06Q 10/00* (2013.01); *G06Q 10/063* (2013.01); *G06Q 10/0635* (2013.01); *G06Q 10/0637* (2013.01); *G06Q 10/10* (2013.01); *G06Q 50/26* (2013.01); *H04W 4/90* (2018.02)

(58) Field of Classification Search
USPC ........................................................ 707/722
See application file for complete search history.

(56) References Cited

U.S. PATENT DOCUMENTS

| 7,672,969 | B1 * | 3/2010 | Gawdiak | G06Q 10/00 707/999.102 |
| 8,655,806 | B2 * | 2/2014 | Jung | G05B 15/02 706/12 |
| 8,738,414 | B1 * | 5/2014 | Nagar | G06Q 10/103 705/7.12 |
| 8,775,960 | B1 * | 7/2014 | Flores | G06Q 10/10 715/771 |
| 8,928,476 | B2 * | 1/2015 | Jerhotova | G08B 31/00 340/521 |
| 9,767,172 | B2 * | 9/2017 | Fackler | G06F 16/252 |
| 2007/0024468 | A1 * | 2/2007 | Quandel | G06Q 10/0635 340/968 |
| 2008/0263174 | A1 * | 10/2008 | Manson | H04L 67/18 709/217 |

(Continued)

*Primary Examiner* — Cam Linh T Nguyen
(74) *Attorney, Agent, or Firm* — Brian C Jones (57) ABSTRACT

This invention is a system creating risk indices, where the risk index is based on a combination of indicators. The indicators for measuring risk are adaptive and dynamic to the changing availability of disaster information and state of the system. Importantly, this research addresses two needs of emergency responders. It provides a risk-based prioritization of key geo-locations to allocate support and mitigation efforts. It provides a mechanism for prioritizing data collection and analysis efforts.

14 Claims, 6 Drawing Sheets

(56) References Cited

U.S. PATENT DOCUMENTS

| | | | |
|---|---|---|---|
| 2009/0254407 A1* | 10/2009 | Fagan | G06Q 10/06 |
| | | | 705/7.23 |
| 2012/0047187 A1* | 2/2012 | Daus | G06F 16/29 |
| | | | 707/805 |
| 2013/0211797 A1* | 8/2013 | Scolnicov | G06Q 10/0639 |
| | | | 703/2 |
| 2014/0108086 A1* | 4/2014 | Prieto | G06Q 10/0637 |
| | | | 705/7.23 |
| 2014/0136276 A1* | 5/2014 | Creagh | G06Q 10/0635 |
| | | | 705/7.28 |
| 2016/0283915 A1* | 9/2016 | Aggarwal | G06F 16/29 |
| 2016/0342914 A1* | 11/2016 | Nawal | G06Q 10/06313 |
| 2018/0025102 A1* | 1/2018 | Kjelland | G06F 17/18 |
| | | | 703/11 |

* cited by examiner

Table 1: State variables associated with sheltering for scenario 0

| Indicator | Levels | Variable ID |
|---|---|---|
| Ratio of shelter population/capacity | high, medium (1-0.75), low (<0.5) | |

Table 2: State variables associated with sheltering for scenario 1

| Indicator | Levels | Variable ID |
|---|---|---|
| Shelter population/capacity | High (>1), medium (1-0.75), low (<0.5) | |
| Sanitation shortage | high, medium low high, medium low | |
| Drinking water shortage | high, medium low | 22 |
| Food supply shortage | | 23 |
| | | 24 |

Figure 4

Table 3: State variables associated with sheltering for scenario 2

| Indicator | Levels | Variable ID |
|---|---|---|
| Shelter population/capacity | High (>1), medium (1.0, .75), low (<0.5) | x4 |
| Sanitation shortage | High, medium, low | x3 |
| Drinking water shortage | High, medium, low | |
| Food supply shortage | High, medium, low | |
| Violent conflict | High, medium, low | x5 |
| Non-violent conflict | High, medium, low | x6 |
| Infectious disease | High, medium, low | |
| Trauma injury | High, medium, low | |
| Dehydration | High, medium, low | |

SYSTEM FOR MULTI-CRITERIA DECISION ANALYSIS

The invention described herein was made by employees of the United States Government and may be manufactured and used by the Government of the United States of America for governmental purposes without the payment of any royalties thereon or therefore.

FIELD OF INVENTION

This invention relates to the field of mathematical modeling systems and more specifically to a computer apparatus and method for transforming heterogeneous geospatial information into predictive models for resource prioritization.

BACKGROUND OF THE INVENTION

In the immediate hours following disaster, information is sparse; however, as time progresses, analysts receive data about the evolving state and impact on various geographical areas. From the chaos, decision makers must distill the critical information needed to target aid most efficiently.

Geographical Information Systems (GIS) are collaborative systems that collect and process data for individuals conducting ground observations and surveys, including data about facilities. GIS data relevant to millions of system variables may be sent from handheld GPS units, personal computing devices, digital cameras, aerial photo satellites, voice recorders and a range of devices which have GPS capability.

Recent disasters have inspired the development of several collaborative GIS tools to collect and map these new sources of information, including OpenStreetMap, Sahana, and Crisis Mappers. It is necessary to structure information from many heterogeneous sources into key variables and metrics most critical to the decision-making process at a given point in time.

Super computers, known in the art, can potentially analyze millions of variables under alternative assumptions. As decisions are made during a disaster, each decision alters the state variables.

Although computational systems, known in the art, can accommodate changes in input, the models produced are static data models. While static models are useful during the planning phase, a static analysis may not be relevant during an actual disaster response effort, due to the dynamic nature of the underlying data and relevance of state variables.

GIS systems, known in the art, do not do multi-criteria decision analysis in real time. To optimize disaster response, it is necessary to perform an integrated assessment of multiple data layers reflecting different scenarios at various points in time, under different assumptions and parameters.

BRIEF SUMMARY OF THE INVENTION

The method and system described herein is a system for performing multi-criteria decisional analysis (MCDA) data received from heterogeneous GIS systems. The system represents multiple data layers using Scenario Objects instantiated from a System Model Class.

The system and method also utilize virtual processing components to update attributes and variables associated with GIS areas, correlated with Risk Objects that continuously update the attributes of Risk Objects as real-time data is received.

Each Scenario Object is a virtual processing component associated with GIS Objects and Risk Objects to represent multiple data layers with attributes that are continuously updated to represent user-defined combinations of critical system state variables for a given scenario.

The output is a scenario-based risk map of geospatial entities in which the geographical entities are quantized into rankings including high priority, medium priority, and low priority for the allocation of response resources and actions.

TERMS OF ART

As used herein, the term "association" means a relationship which correlates one data values or one or more data sets for access by computations.

As used herein, the term "attribute" means variable with which a value is associated; attributes may be static or dynamic.

As used herein, the term "class" means a virtual processing component from which other objects and/or virtual processing components are instantiated; objects and/or virtual processing components within a class may have common attributes and functions.

As used herein, the term "data set layers" means values or groups of data values having an association.

As used herein, the term "distributed computer apparatus" means a computer apparatus having components in one or multiple locations.

As used herein, the term "functions" means operations, processes and/or computations invoked when a value is updated or changed.

As used herein, the term "Geographical Information System" (GIS) means collaborative systems that collect and process data for individuals conducting ground observations and surveys, including data about facilities.

As used herein, the term "input" means data which updates value or attribute.

As used herein, the term "instantiate" means to create an instance of a new processing component, class, object or other data structure.

As used herein, the term "invoke" means to initiate or call a function or an operation which causes a physical change or transformation.

As used herein, the term "like" means derived from the same class, parent object and/or data structure; or otherwise having common attributes.

As used herein, the term "model" means a digital representation of phenomena which may be updated continuously, sporadically or in real time.

As used herein, the term "multi-criteria decision analysis" (MCDA) means a tool for or manner of optimizing disaster response using data received from heterogeneous GIS systems by performing an integrated assessment of multiple data layers reflecting different scenarios at various points in time, under different assumptions and parameters.

As used herein, the term "multiple criteria value function" means operations or processes for evaluating multiple conflicting criteria in decision-making.

As used herein, the term "object" means a virtual processing component that contains both data and data structures and code which performs operations on the data structures.

As used herein, the term "processor" means hardware or software having processing capability which may be bound to non-modifiable (static) values and functions.

As used herein, the term "quasi-unique" means unique to a project or data set.

As used herein, the term "real time" means during a user session, or any period allocated for study and analysis.

As used herein, the term "scenario" means a data set relating to one potential system state.

As used herein, the term "static" means non-modifiable during run time. As used herein, the term "virtual processing component" refers to software which performs a computational process and functions identically to the circuitry of a physical processor.

DETAILED DESCRIPTION OF THE INVENTION

Figure 1:
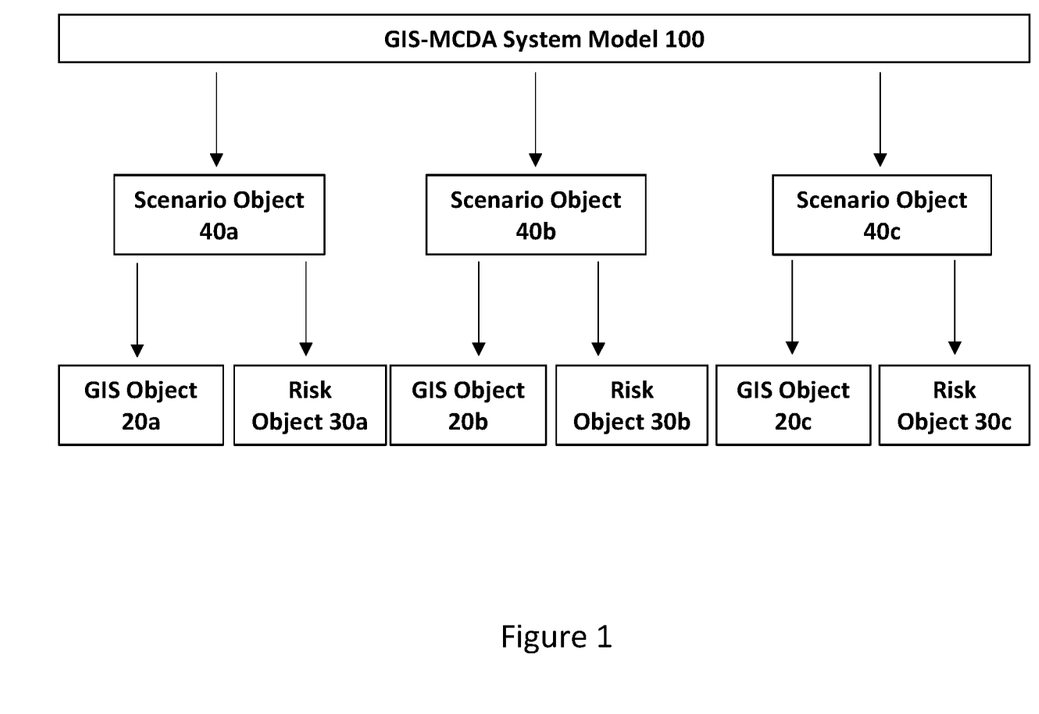
FIG. 1 illustrates an instance of a GIS-MCDA system model, which is a virtual processing component.

FIG. 1 illustrates an instance of GIS-MCDA System Model 100, which is a virtual processing component. GIS-MCDA System Model 100 processes information originating from multiple geographical areas, and applies multi-criteria decisional analysis (MCDA) to prioritize resources allocated to each geographical area.

GIS-MCDA System Model 100 is a class object, which represents an entire geographical system under study. GIS-MCDA System Model 100 uses virtual processing components referred to as Scenario Objects 40a, 40b, and 40c to represent geographical area within the system under differing assumptions.

Scenario Objects 40a, 40b, and 40c are independent instances of the GIS-MCDA System Model 100, which inherit the attributes and GIS Object associations of GIS-MCDA System Model 100. Each GIS-MCDA System Model 100 is associated with GIS Objects 20a, 20b, and 20c representing geographical areas.

GIS Objects 20a, 20b, and 20c include geographical attribute values. Each GIS Object 20a, 20b, and 20c is further associated with Risk Objects 30a, 30b, and 30c. Risk Objects 30a, 30b, and 30c include risk attribute values and functions, and invoke functions to update geographical attribute values. Risk Objects 30a, 30b, and 30c include risk-ranking functions and attributes, which determine the prioritization and weight of the risk, including acceptable risk thresholds.

GIS Objects 20a, 20b, and 20c are prioritized based on the aggregate calculated values of the risks with which they are associated.

Figure 2:
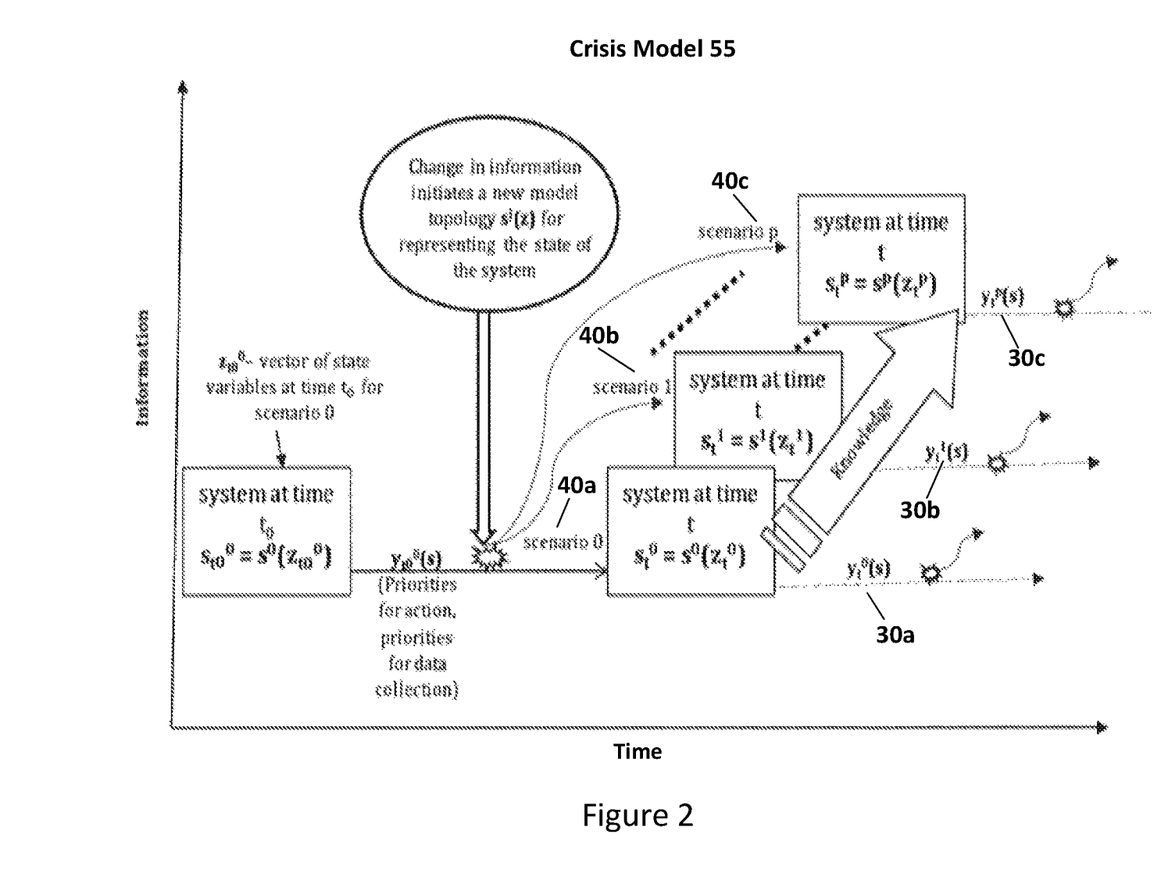
FIG. 2 illustrates an exemplary Crisis Model for modeling geospatial and multi-criteria decisions in a system experiencing a crisis from a natural disaster.

FIG. 2 illustrates an exemplary Crisis Model 55 for modeling geospatial and multi-criteria decisions relevant to a system experiencing a crisis from a natural disaster. Crisis Model 55 includes attributes and functions necessary for updating data for analysis during a crisis, which are inherited from the parent GIS-MCDA System Model 100. Crisis Model 55 is associated with multiple Scenario Objects 40a, 40b, and 40c; and is an independent instance of GIS-MCDA System Model 100. Each Scenario Object 40a, 40b, and 40c is a virtual processing component, which independently receives data inputs and performs functions to update the scenario attributes for each Scenario Object 40a, 40b, and 40c to reflect the system state at a discrete point in time.

In various embodiments, Crisis Model 55 may further include functions to update Scenario Objects 40a, 40b, and 40c globally, or to update Scenario Objects 40a, 40b, and 40c individually.

Risk Objects 30a, 30b, and 30c are individually updated, and functions are invoked to Scenario Objects 40a, 40b, and 40c, which compute acceptable risk threshold. Risk Objects 30a, 30b, and 30c include risk-ranking values which determine the periodization and weight of the risk and may be dependent variables.

Updating attribute values within Risk Objects 30a, 30b, and 30c invokes functions within GIS Objects 20a, 20b, and 20c to reprofile and update the prioritization rankings and values associated with each GIS Object 20a, 20b, and 20c.

Accordingly, the prioritization rankings and values associated with each GIS Object 20a, 20b, and 20c are continuously updated and may be used to prioritize responses and resource allocation.

Risk Factor Objects are populated with data attributes that are continuously modified in real time as more information becomes available. In various embodiments, updates to attributes of risk factors, such as increases in population, will invoke functions to elevate or reduce the priority of risk factors, as well as modifying dependencies.

During a crisis, as functions are invoked to update dependent attribute values, the system may or may not update dependencies, causing geolocation objects to be reprioritized.

In various embodiments, if actual data differs materially from assumptions, or if errors in prior reporting are disclosed, a user or system function may instantiate a new Scenario Object.

Each Scenario Object 40a, 40b, 40c may include static and non-static system state attributes and processing code that represents the state of the system at time, t, as measured by the collection of key state attributes. An Initial Scenario Object has initial state, referred to as z(t), which includes all attribute values of a system available at time, t. An updated System Object, y(t), is produced during run-time, an output that reflects updated system variables.

In various embodiments, Crisis Model 55 may also be associated with a user interface object, which graphically represents a prioritized set of areas where action is needed, and a prioritized set of data gaps.

GIS-MCDA System Model 100 may be configured with various attributes, which are inherited by Scenario Objects 40a-c and updated as new information is obtained.

Consider an example in which change in information is substantial, all variables in the system class may be updated. Scenario Objects 40a-c, may be instantiated from GIS-MCDA System Model 100 to characterize the state of the system.

In various embodiments, a user may thus define a new set of variables, $z(t)$, and/or a new functional relationship, $s(z(t))$, for characterizing the state of the system. Each of these shifts in model topology is represented as a scenario, $S=\{s_1, \ldots, s_p\}$, so for any given point in time, the state of the system is defined as $s_j$, where j represents a given scenario (model topology) in set, S, for time, t.

As knowledge grows over time, decision makers are able to adapt and understand the changes in the state of the system over both the information space and temporal space. In one exemplary embodiment, set $A=\{a_1, \ldots, a_n\}$ of n criteria is used.

Geospatial data may be linked and contingently modified if ranges and parameters are exceeded. Alternatives may be prioritized for allocation of disaster response resources, and attributes of GIS-MCDA System Model 100 may be populated accordingly. To evaluate and compare each alternative, a set $Z=\{Z_1, \ldots, Z_m\}$ of m criteria is used. In the case study, these criteria describe different factors associated with higher risk state attributes, such as a shelter population/capacity ratio, or food and water supply levels.

In various embodiments, Crisis Model 55 or GIS-MCDA System Model 100 is configured to perform a multiple criteria value function. In one embodiment, this function is constructed to rank the geospatial alternatives from high to low risk. In various embodiments, GIS-MCDA System Model 100 may be configured to use Boolean overlay operators and weighted summation procedures.

Various embodiments of GIS-MCDA System Model 100 may be configured to perform an additive multiple criteria value function. In one exemplary embodiment, additive multiple criteria value, $V(a,\cdot)$, has the form:

$$V(q)=WkVk(aD \text{ with } El^i-l \ wk=1 \text{ and } 0 \ Vk(ai)l \text{ for all } k=l,\ldots,m.$$

In this exemplary embodiment, the quantity, Vk(ai), is the assessed value of alternative ai in criterion, z.k. The weights, {Wk}, represent the tradeoffs across the criteria. In general, V(ai) V(aj) implies alternative ai is at least as preferred as alternative aj.

In this exemplary embodiment, the state of the system at time t, st, is the vector of all Vk(a). In the case of disaster response, there is a desire to understand how different combinations of criteria based on current information sources and states of the system influence priority-setting among geospatial alternatives. Thus, a set of scenarios defined as $\{s_1,\ldots,s_k\}$, is constructed and used to reflect unique combinations of criteria and criteria weights based on that state of the system, relevance of criteria, and available data sources.

Crisis Model 55 provides output, y(t), as a prioritized subset of high-risk alternatives for each scenario, and a set of alternatives for further information gathering.

Within GIS Objects 20a, 20b, and 20c, various attributes are populated by GIS or other data that may be categorical, ordinal, or numerical. This updated data is converted to relative ratings from 0 to 1 representing low to high risk. This can be done in a number of ways, including a linear standardization, or using defined rankings. In other embodiments, weighting can be accomplished using swing-weighting.

Figure 3:
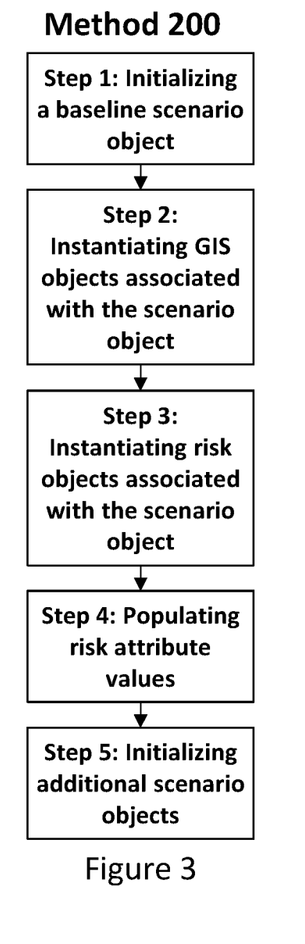
FIG. 3 is an exemplary embodiment of a method for instantiating a Crisis Model.

FIG. 3 is an exemplary embodiment of Method 200 for instantiating Crisis Model 55. Crisis Model 55 inherits selected attributes, functions, and dependencies from GIS-MCDA System Model 100, which can be modified to reflect a specific system, crisis, or heterogeneous data set from multiple sources, etc.

Step 1 is the step of initializing a baseline Scenario Object for $T_0$.

Step 2 is the step of instantiating GIS Objects and associating them with the Scenario Objects to identify the geographical areas to be tracked. This step may include setting coordinates, parameters, identifying physical features, facilities, or initializing and populating other attributes or GIS Objects, including thresholds or ranking attributes for prioritizing areas with the highest risk.

Step 3 includes the step of instantiating Risk Object attributes, and associating them with the Scenario Objects.

Step 4 includes the step of populating risk attribute values.

Step 5 is the step of initializing additional Scenario Objects (e.g. $T_1$, $T_2$, $T_3$).

Step 6 is the step of updating risk attributes using geospatial data in real time, and reprioritizing GIS Objects.

Figure 4:
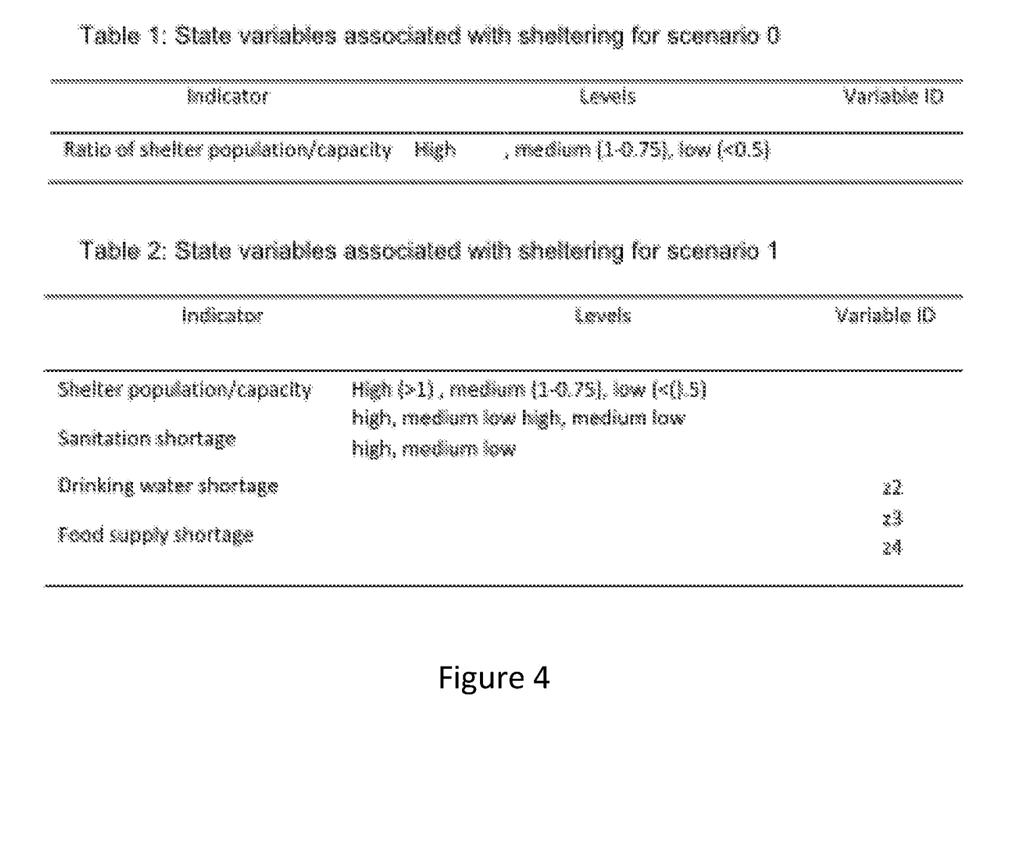
FIG. 4 illustrates exemplary output generated by a GIS-MCDA System Model used to prioritize action for a scenario requiring emergency shelter.

FIG. 4 illustrates exemplary output generated by GIS-MCDA System Model 100 used to prioritize action for a scenario requiring emergency shelter.

In the exemplary embodiment illustrated, a displaced population has changed their location and resources need to be allocated appropriately. Attribute values associated with where the population will go and how many people will arrive at each shelter must be changed dynamically. GIS-MCDA System Model 100 is configured with the existing set of sheltering data that names the locations of shelters.

Scenario Object 40 is configured with attributes to be populated with values. Attributes reflect variables to monitor. Initially, we assume that the decision makers only have incoming information about the ratio of shelter population/capacity.

In the exemplary embodiment shown, GIS-MCDA System Model 100 is associated with GIS Objects 20a, 20b, and 20c, which correlate shelter attributes with location and produces an output upon which decisions may be based.

Based on the output produced, decisions may be made to allocate supplies and resources to areas having a higher population.

Figure 5:
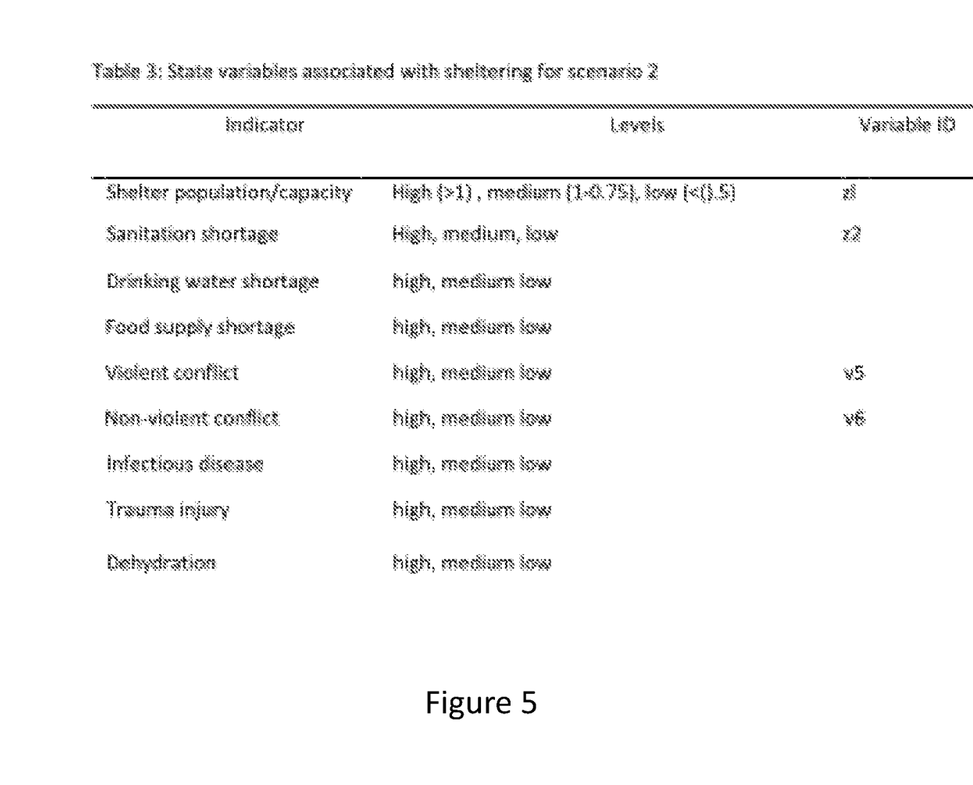
FIG. 5 illustrates exemplary system output that reflects a prioritization of resources determined by updating Scenario Objects.

FIG. 5 illustrates exemplary system output that reflects a prioritization of resources determined by updating Scenario Objects 40a-c. For example, food and water supplies and sanitation levels may be established as attributes and defined values for tracking. An additional function of Scenario Object 40 may be to calculate prioritization of tracked variables.

Given limited resources in an emergency situation, there is a need to prioritize information gathering and analysis requirements.

Figure 6:
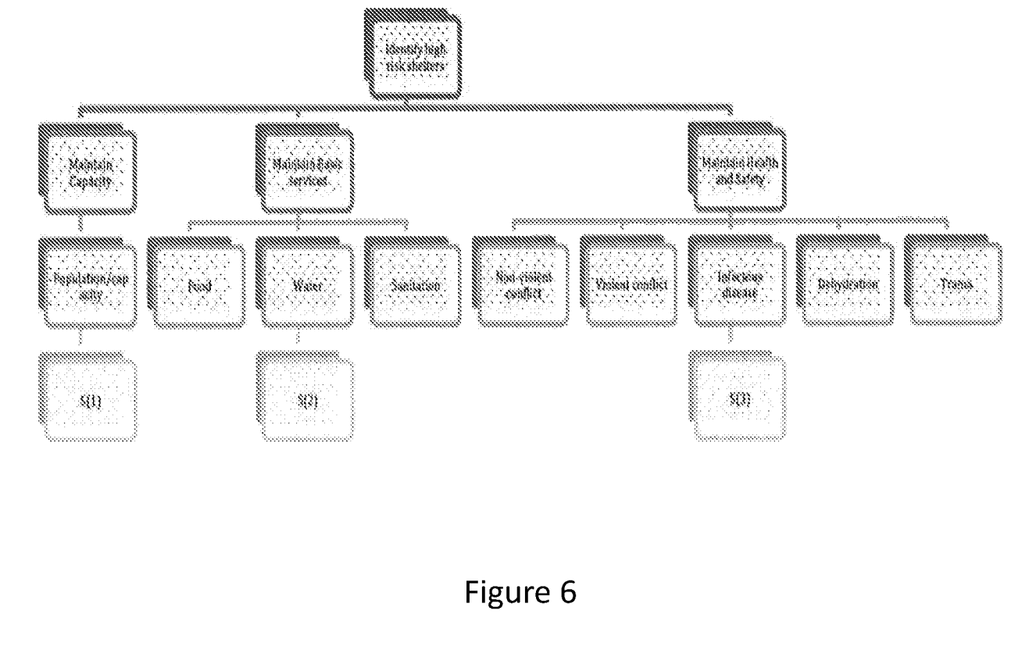
FIG. 6 illustrates an exemplary user interface generated by a GIS-MCDA Model.

FIG. 6 illustrates an exemplary user interface generated by GIS-MCDA Model 100.

What is claimed is:

1. A distributed computer apparatus having memory and a geospatial information data processor to perform optimized disaster response using data received from heterogeneous geographical information systems (GIS) by performing an integrated assessment of multiple data layers reflecting different scenarios at various points in time, under different assumptions and parameters (MCDA), said apparatus comprised of:

a Project Object which receives input parameters which include time and geographical coordinates to instantiate a project;

and a plurality of virtual processing components to produce data set layers including:

at least one Scenario Object, wherein each of said at least one Scenario Object is configured with static attributes and functions to update said Scenario attributes;

at least one GIS Object associated with each of said at least one Scenario Object wherein each of said at least one GIS Object is configured with static attributes and functions to update said static attributes;

at least one Risk Object associated with each of said at least one GIS Object;

said at least one Risk Object is associated with said static attributes and functions to update said static attributes, including one or more processing components which may be configured to perform an additive multi-criteria value function in which an additive multi-criteria value, $V(a,\cdot)$ is obtained by performing a function represented as:

$$V(q) = W_k V_k(aD \text{ with } E I^i - 1 \text{ } wk = 1 \text{ and } 0 V_k(ai) l \text{ for all } k = l, \ldots, m$$

wherein quantity $V_k(ai)$ is the assessed value of alternative $ai$ in criterion $z.k$, Weights $\{Wk\}$ represent the tradeoffs across the criteria and $V(ai)$ $V(aj)$ imply alternatives.

2. The distributed computer apparatus of claim 1, which further includes at least one System Class Object for instantiating said Scenario Objects.

3. The distributed computer apparatus of claim 1, wherein each of said Scenario Objects is associated with at least one System Object, and wherein each association produces one or more scenarios of said data set layers.

4. The distributed computer apparatus of claim 1, wherein each of said (GIS Objects is associated with at least one Scenario and wherein each association produces one or more of said data set layers.

5. The distributed computer apparatus of claim 1, wherein each of said Risk Objects is associated with one or more of said GIS Objects, and wherein each association produces one or more of said data set layers.

6. The distributed computer apparatus of claim 1, which further includes one or more MCDA Processors which performs multi-criteria decision analysis computations using data values extracted from two or more of said data set layers.

7. The distributed computer apparatus of claim 6, which iteratively updates data values associated with said Risk Objects, data values associated with said GIS Objects and data values associated with said Scenario Objects based on the results of said multi-criteria decision analysis computations.

8. The distributed computer apparatus of claim 1, wherein attributes of like types of said virtual processing components can be simultaneously modified.

9. The distributed computer apparatus of claim 1, wherein each of said virtual processing components includes said static attributes that may be defined by a user.

10. The distributed computer apparatus of claim 1, wherein each of said Scenario Objects includes at least one said input parameter and wherein said GIS Objects are associated with one or more of said Risk Objects having quasi unique risk attributes to reflect different risk scenarios.

11. The distributed computer apparatus of claim 1, which further includes a heterogeneous GIS data processing component which receives updated attribute values from heterogeneous GIS sources and updates attribute values for one or more said virtual processing components, wherein one or more of said attribute values are selected to from a group of attribute value types consisting of time, risk, prioritization, ranking, GIS, scenario, resource, and system attributes.

12. The distributed computer apparatus of claim 1, wherein each of said at least one Risk Objects includes a Risk Priority Value and is configured with functions to is update said Risk Priority Value.

13. The distributed computer apparatus of claim 12, wherein updating any of said at least one Risk Priority Value invokes one or more Prioritization Functions in one or more of each of said at least one GIS Objects to update one or more of said static attribute values.

14. The distributed computer apparatus of claim 1, which further includes an output generated by a Crisis Model which visually displays said data set layers representing prioritized alternatives.

* * * * *